Patented Sept. 18, 1928.

1,684,634

UNITED STATES PATENT OFFICE.

MARTIN LUTHER, KURT PIEROH, AND ERICH KRANEPUHL, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY the so-called Marquart's mass (a highly fireproof product of purest kaolin and alumina). Isobutylamine is completely converted into isobutyronitrile.

What we claim is:

1. The process of catalytically dehydrogenating organic compounds which consists in passing the vapors of the said compounds at an elevated temperature over a catalyst comprising a compound of a metal with a metalloid alone selected from the fifth and sixth group of the periodic system having an atomic weight between 31 and 209.

2. The process of catalytically dehydrogenating organic compounds which consists in passing the vapors of the said compounds at an elevated temperature over a catalyst comprising a compound of a heavy metal with a metalloid alone selected from the fifth and sixth group of the periodic system having an atomic weight between 31 and 209.

3. The process of catalytically dehydrogenating organic compounds which consists in pasisng the vapors of the said compounds at an elevated temperature over a catalyst comprising a compound of zinc with a metalloid alone selected from the fifth and sixth group of the periodic system having an atomic weight between 31 and 209.

In testimony whereof we have hereunto set our hands.

MARTIN LUTHER.
KURT PIEROH.
ERICH KRANEPUHL.